(12) United States Patent
Azema

(10) Patent No.: US 6,593,025 B2
(45) Date of Patent: Jul. 15, 2003

(54) BATTERY INCLUDING PRESSURE-SENSITIVE CURRENT-INTERRUPTION STRUCTURE

(75) Inventor: Tadamitsu Azema, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 190 days.

(21) Appl. No.: 09/769,067

(22) Filed: Jan. 24, 2001

(65) Prior Publication Data
US 2001/0010876 A1 Aug. 2, 2001

(30) Foreign Application Priority Data

Jan. 31, 2000 (JP) ........................................ 2000-022850

(51) Int. Cl.⁷ .............................................. H01D 10/42
(52) U.S. Cl. .......................................... 429/61; 429/66
(58) Field of Search ...................................... 429/61, 66

(56) References Cited

U.S. PATENT DOCUMENTS

| | | | |
|---|---|---|---|
| 4,943,497 A | 7/1990 | Oishi et al. ................... | 429/53 |
| 6,004,694 A | * 12/1999 | Van Lerberghe .......... | 429/61 X |
| 6,248,470 B1 | * 6/2001 | Azema et al. ................. | 429/61 |
| 6,335,109 B1 | * 1/2002 | Takahashi et al. ......... | 429/61 X |

FOREIGN PATENT DOCUMENTS

| | | | |
|---|---|---|---|
| EP | 0 862 230 A2 | 9/1998 | |
| JP | 2000-12094 | 1/2000 | |
| JP | 2001-185124 | * 7/2001 | ............ H01M/2/34 |
| JP | 2001-196049 | * 7/2001 | ............ H01M/2/34 |

* cited by examiner

Primary Examiner—Stephen Kalafut
(74) Attorney, Agent, or Firm—Brinks Hofer Gilson & Lione

(57) ABSTRACT

An interruption structure includes an operating member disposed outside a casing, a first end of the operating member being disposed above a power generating unit and displaceable toward the outside as an internal pressure rises, a fixing member positioned opposing the operating member across the power generating unit, a holding member disposed over a sealed part of the casing and fixed to the fixing member, and an element having an electrically conductive path, held by the holding member, the element being electrically connected to at least one of the lead terminals at one end of the element and to an external electrode at the other end of the element.

10 Claims, 6 Drawing Sheets

BATTERY INCLUDING PRESSURE-SENSITIVE CURRENT-INTERRUPTION STRUCTURE

BACKGROUND OF THE INVENTION

1. Field of the Invention

The present invention relates to batteries including pressure-sensitive current-interruption structures. In particular, the present invention relates to a battery including a pressure-sensitive current-interruption structure preferably used for a lithium-polymer secondary battery.

2. Description of the Related Art

Hitherto, reduction in size and thickness has been required of devices such as mobile phones and camcorders. Accordingly, batteries used in these devices have also been required to be reduced in size and to have a low profile. A lithium-polymer secondary battery may be selected as a likely candidate to meet these requirements.

Even when a battery is made smaller, measures for safety must be taken. When a lithium-polymer secondary battery is overcharged or is charged by an electrical current larger than a specified value, chemical reactions occur in the lithium-polymer secondary battery, thereby producing gas and increasing pressure in the battery. Therefore, there is a risk of cracks forming in the casing of the lithium-polymer secondary battery and the explosion thereof.

Therefore, pressure-sensitive current-interruption structures have been proposed which cut electrical paths between power-generating units and external terminals of batteries when the internal pressure of the batteries increases above predetermined values.

A pressure-sensitive current-interruption structure is disclosed in, for example, U.S. Pat. No. 4,943,497, in which an explosion proof valve, which expands toward the outside as the pressure in a battery rises, is provided in a metallic case of the battery, and the metallic case is separated from an internal electrode when the explosion proof valve expands toward the outside due to the pressure rise, thereby interrupting electrical current.

A plate-shaped lithium-polymer secondary battery which is now widely used is covered by an outer cover formed by laminated films and the battery body has a thickness of only 1 to 4 mm. Therefore, there is a problem in the known lithium-polymer secondary battery in that spaces for receiving a diaphragm cannot be secured, the diaphragm cannot be affixed, and it is difficult to mount the diaphragm when the diaphragm, etc., are mounted on an end face of a metallic case of the battery.

On the other hand, when a diaphragm or an interruption structure using the same is mounted on a plate-shaped surface (a major surface) of the battery, the thickness of the thin plate-shaped battery is increased.

SUMMARY OF THE INVENTION

Accordingly, it is an object of the present invention to provide a battery including a pressure-sensitive current-interruption structure which can be mounted without increasing the size and the thickness of the battery by using a space formed in a sealed part of a casing. The pressure-sensitive current-interruption structure can be positioned accurately and be affixed easily compared with a method in which an interruption structure is bonded to a sealed part of a casing. The pressure-sensitive current-interruption structure is not affected by an adhesive or the like and is not significantly affected by the strength of the sealed part of a casing.

To these ends, according to an aspect of the present invention, a battery including a pressure-sensitive current-interruption structure comprises a plate-shaped power-generating unit; a casing hermetically sealed and containing the power generating unit, deformable by an internal pressure; a plurality of lead terminals which are electrical paths from the power generating unit to the outside of the casing; a sealed part, which is a part of the casing, disposed at an end of the power generating unit and formed thinner than the thickness of a space receiving the power generating unit; and an interruption structure. The interruption structure includes an operating member disposed outside the casing, at least one end of the operating member being disposed above or under the power generating unit and displaceable toward the outside as the internal pressure rises; a fixing member having at least one part thereof being positioned opposing the operating member across the power generating unit; an insulative holding member disposed above or under the sealed part of the casing and fixed to the fixing member; and an element having an electrically conductive path, held by the holding member, the element being electrically connected to at least one of the lead terminals at one end of the element and to an external electrode at the other end of the element. The other end of the operating member is positioned at the sealed part side of the element, the other end of the operating member being displaced in accordance with the displacement of the one end of the operating member caused by the internal pressure, thereby cutting the element when displacing over a predetermined value. With this arrangement, the battery can be made compact and the thickness thereof is not increased by using a space formed at the sealed part of the casing. Therefore, compared with a method in which an interruption structure is bonded to the sealed part, the interruption structure can be affixed easily by being positioned accurately without being affected by an adhesive (for example, by variation in adhesive strength due to temperature variation, elapse of time, a gas, variation in the thickness of the adhesive, and the like), and the strength of the sealed part (top seal) does not significantly affect the characteristics of the interruption structure.

According to another aspect of the present invention, a battery including a pressure-sensitive current-interruption structure comprises a plate-shaped power-generating unit; a casing hermetically sealed and containing the power generating unit, deformable by an internal pressure; a plurality of lead terminals which are electrical paths from the power generating unit to the outside of the casing; a sealed part, which is a part of the casing, disposed at an end of the power generating unit and formed thinner than the thickness of a space receiving the power generating unit; and an interruption structure. The interruption structure includes an insulative holding member disposed above or under the sealed part of the casing and fixed to a fixing member; an element having an electrically conductive path, held by the holding member, the element being electrically connected to at least one of the lead terminals at one end of the element and to an external electrode at the other end of the element; and an operating member disposed outside the casing, one end of the operating member being disposed above or under the power generating unit and displaceable toward the outside as the internal pressure rises, the other end of the operating member being disposed in the vicinity of the element. The other end of the operating member is positioned opposite to the one end with respect to a supported part of the operating member and opposite to the sealed-part of the casing with respect to the element, the other end of the operating member being displaced in accordance with the displacement of the one end of the operating member in the opposite direction caused by the internal pressure, thereby cutting the element when displacing over a predetermined value. With this arrangement, the operational pressure can be stable.

The operating member and the fixing member are preferably connected to each other. With this arrangement, the element is not likely to be damaged while handling during transportation and the like. When the operating member and the fixing member are not connected to each other, a laborious work, such that the operating member is tentatively affixed by a tentatively affixing material and the affixing material is removed after mounting, is necessary.

The operating member and the fixing member may be formed integrally with each other. With this arrangement, the number of components can be reduced, manufacturing processes can be simplified, and the components can be positioned accurately.

The operating member may include a contact part for receiving an external force applied to a surface of the operating member, and the fixing member may include a supporting platform to come into contact with the contact part. With this arrangement, the element is not likely to be damaged when an external force is applied to the operating member in a direction perpendicular to the surface thereof.

A fixing part between the fixing member and the holding member may be positioned at the same level as that of the operating member. With this arrangement, a wide freedom in designing is provided. That is, when the holding member holds the operating member and the fixing member at the level of the fixing member, the relationship of positions between the operating member and the holding member varies according to the thickness of the battery or the sealed part of the casing, whereby the relationship of positions, the strength of each component, and the like must be redesigned in accordance with the variation in size or the like of the components. When the operating member and the fixing member are held by the holding member at the level of the operating member, only the distance between the operating member and the fixing member must be changed, and complex redesigning is not necessary.

DESCRIPTION OF THE PREFERRED EMBODIMENTS

Embodiments according to the present invention are described below with reference to the drawings.

A first embodiment of the present invention is described as follows with reference to FIGS. 1 to 5.

Figure 1:
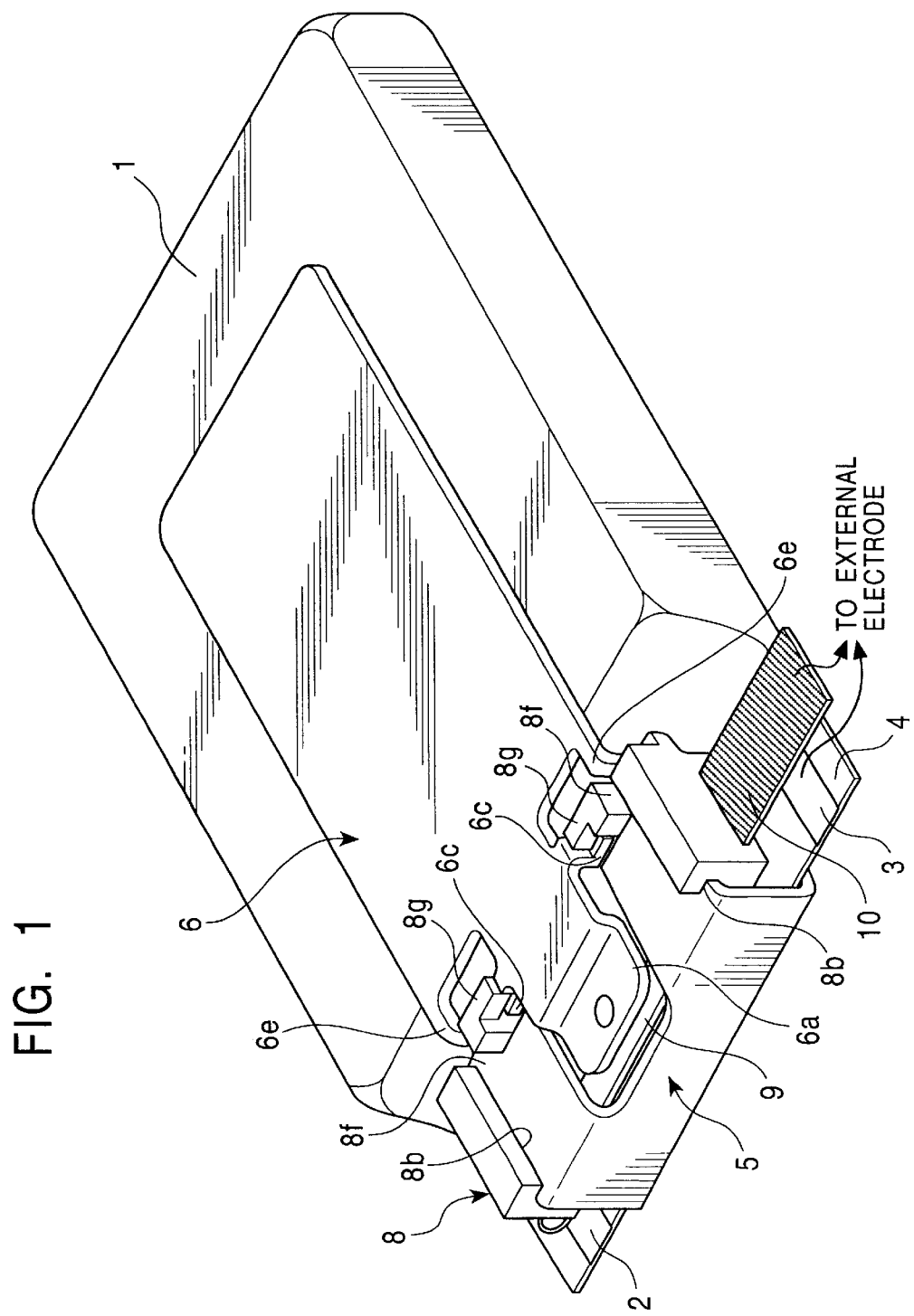
FIG. 1 is a perspective view of a battery including a pressure-sensitive current-interruption structure, according to a first embodiment of the present invention.
Figure 2:
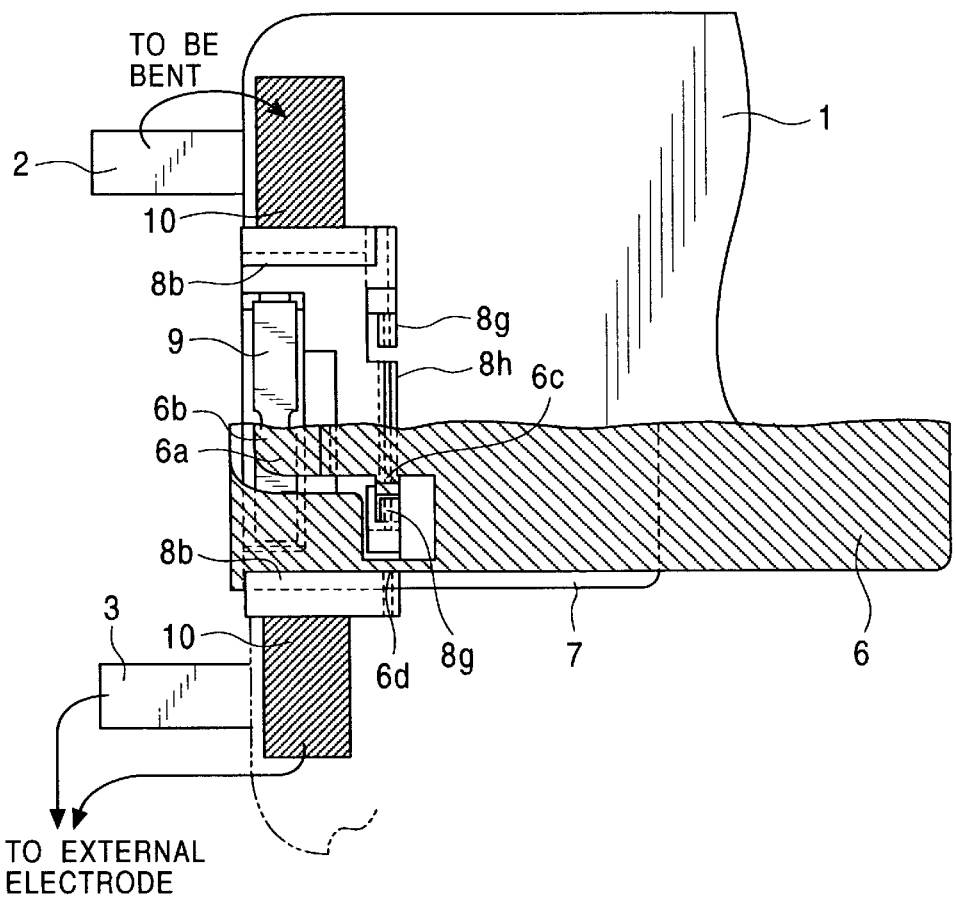
FIG. 2 is a plan view of the battery including a pressure-sensitive current-interruption structure, shown in FIG. 1, of which a part is eliminated.
Figure 3:
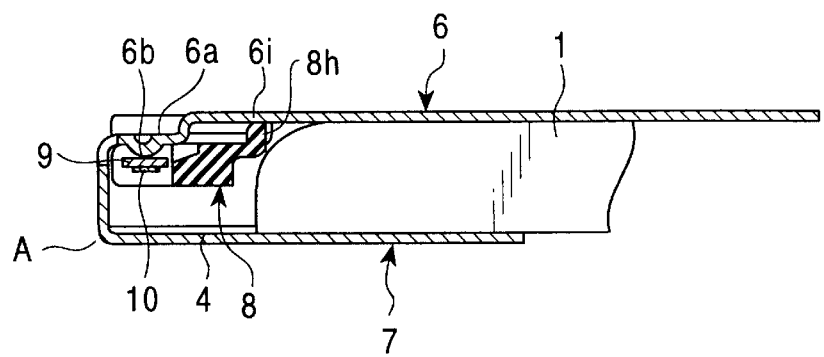
FIG. 3 is a longitudinally sectional view of the battery including a pressure-sensitive current-interruption structure, shown in FIG. 2.
Figure 4:
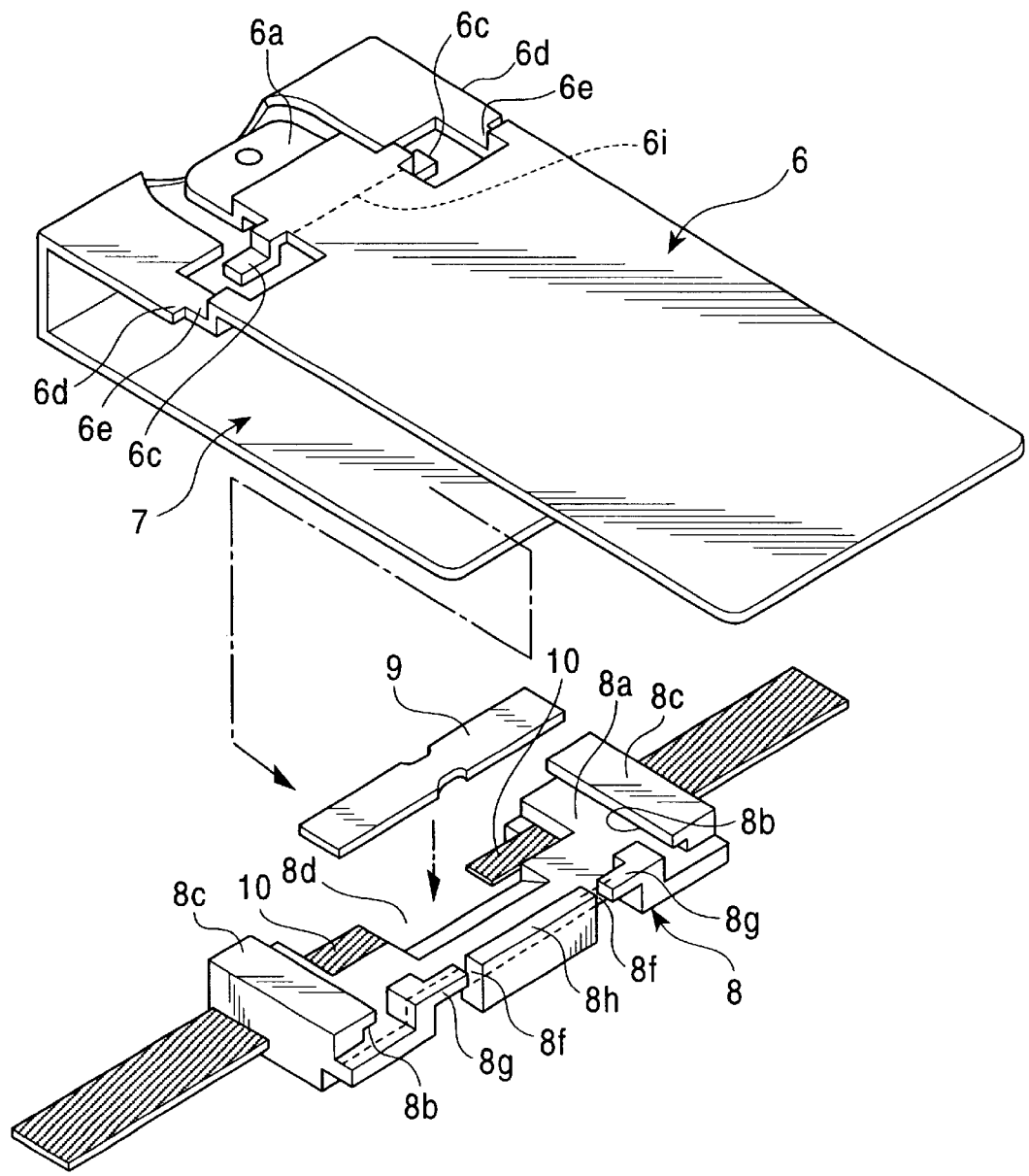
FIG. 4 is an exploded perspective view of the battery including a pressure-sensitive current-interruption structure, according to the first embodiment of the present invention.
Figure 5:
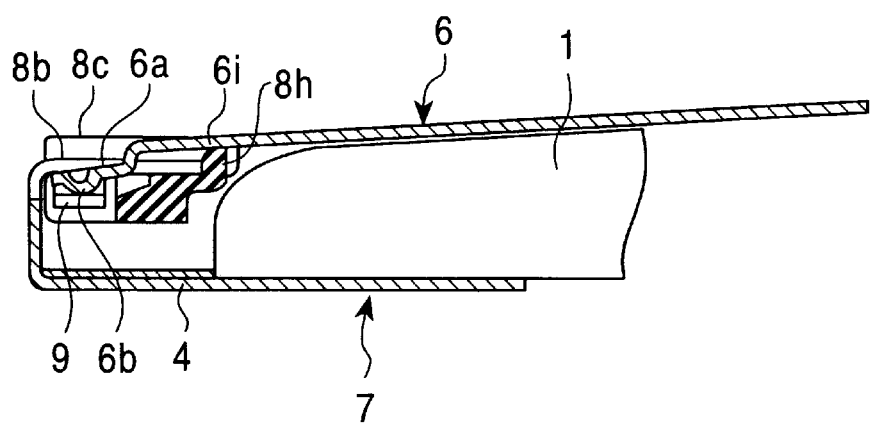
FIG. 5 is a sectional view of the battery including a pressure-sensitive current-interruption structure, shown in FIG. 3, the pressure-sensitive current-interruption structure being in operation.

FIG. 1 is a perspective view of a battery including a pressure-sensitive current-interruption structure, according to the first embodiment of the present invention. FIG. 2 is a plan view of the battery including a pressure-sensitive current-interruption structure, shown in FIG. 1, of which a part is eliminated. FIG. 3 is a longitudinally sectional view of the battery including a pressure-sensitive current-interruption structure, shown in FIG. 2. FIG. 4 is an exploded perspective view of the battery including a pressure-sensitive current-interruption structure, according to the first embodiment of the present invention. FIG. 5 is a sectional view of the battery including a pressure-sensitive current-interruption structure, shown in FIG. 3, the pressure-sensitive current-interruption structure being in operation. In FIG. 2, an upper part in the drawing of an operating member 6 is removed and components under a casing 1 (a power-generating unit) are shown through the casing 1.

In these drawings, the casing 1 is provided therein with a plate-shaped power-generating unit (not shown) which is a power generating element. The hermetically sealed casing 1 is deformable by internal pressure.

Lead terminals 2 and 3 are electrical paths from the power-generating unit to the outside of the casing 1.

A sealed part 4 of the casing 1 is disposed at an end of the power-generating unit. The sealed part 4, which is an integral part of the casing 1, is formed thinner than a part in which the power-generating unit is received.

An interruption structure 5 is disposed in a space formed above the sealed part 4. The interruption structure 5 includes, as major components thereof, the operating member 6 disposed outside the casing 1 and above or under the power-generating unit at at least one end of the operating member 6, the operating member 6 being deformable toward the outside as the internal pressure rises. The interruption structure 5 also includes a fixing member 7 of which at least one part is disposed opposing the operating member 6 with the power-generating unit therebetween, an insulative holding member 8 disposed above or under the part of the sealed part 4 and fixed to the fixing member 7, and an element 9 including a ceramic substrate having brittleness, the ceramic substrate being held by the holding member 8 and formed thereon with an electrically conductive path (not shown) electrically connected to at least one of the lead terminals 2 and 3 at one end of the conductive path and to an external electrode at the other end thereof.

In FIGS. 1 to 4, the holding member 8 includes a plate-shaped base 8a, a pair of mating tabs 8c projecting from the base 8a and individually provided with mating recesses 8b having mating faces opposing each other, and a cut-away part 8d formed in the rectangular base 8a at a longer side opposite to the power-generating unit, for receiving the element 9. The holding member 8 is also provided with cut-away slits 8f for receiving the operating member 6 sliding through the cut-away slits 8f when mounted, supporting parts 8g disposed adjacent to the cut-away slits 8f, respectively, which form a supporting point for supporting the operating member 6 at a supported part of the operating member 6, and a supporting platform 8h projecting between the cut-away slits 8f and serving as the supporting point together with the supporting parts 8g for supporting the operating member 6 at the supported part disposed at the bottom face of the operating member 6 which is described below.

In FIG. 4, lead plates 10 which are electrical paths protrude from the edges opposing each other, respectively, of the cut-away part 8d of the holding member 8 for receiving the element 9. The element 9 is placed on the lead plates 10 so as to be electrically connected at ends of the element 9 to the lead plates 10 at the protruding ends of the lead plates 10, respectively. The other ends of the lead plates 10 protrude to the outside passing through the base 8a of the holding member 8. An end of the operating member 6 opposite to the end thereof disposed above or under the power-generating unit is disposed on the upper face of the element 9.

The operating member 6 and the fixing member 7 are formed integrally with each other by bending a rectangular plate, as shown in FIG. 4, so that the operating member 6 and the fixing member 7 oppose each other at a distance from each other slightly shorter than the thickness of the casing 1 in a free state. The length of the overall fixing member 7 is set greater than the operating member 6. A major portion of the fixing member 7 is disposed under the casing 1.

A part of the operating member 6 is cut away in the vicinity of the bent portion so that an operating tab 6a is formed protruding toward the bent portion. The operating member 6 is further bent in a step-shape, so as to form first step-shaped bent parts at the outside of the cut-away part, toward the bent portion disposed between the operating member 6 and the fixing member 7. The distance between the operating member 6 and the fixing member 7 gradually increases toward the ends opposite to the bent portion between the operating member 6 and the fixing member 7. The casing 1 is sandwiched between the ends of the operating member 6 and the fixing member 7. The operating tab 6a has a protrusion 6b downwardly protruding so as to come into contact with the element 9 at a center of the upper face of the element 9. With this arrangement, the current can be stably interrupted by a breaking force applied from the operating tab 6a to the element 9 even when the battery is thin. A second step-shaped bent part of the operating tab 6a is formed toward the end of the operating tab 6a from the first step-shaped bent parts of the operating member 6, the first step-shaped bent parts being formed at portions of the operating member 6 disposed at the lateral sides of the cutaway part which forms the operating tab 6a. The base end of the operating tab 6a, that is, a flat portion disposed at the higher level of the second step-shaped part is provided with mating tabs 6c formed at lateral edges of the flat portion, each mating tab 6c extending downwardly, then being bent toward the outside at the end thereof. The mating tabs 6c of the operating member 6 are formed so as to be individually positioned under the supporting parts 8g of the holding member 8. A portion toward the bent portion of the operating member 6 is formed wider than the end thereof opposite to the bent portion. Each side edge of the portion toward the bent portion serves as a mating plate 6d. The operating member 6 mates with the holding member 8 in a manner such that the mating plates 6d of the operating member 6 are inserted into the mating recesses 8b of the holding member 8, respectively. Thinner parts 6e are formed at the lateral sides of the operating member 6, respectively, toward the first step-shaped parts, respectively, of the operating member 6. The mating tabs 6c of the operating member 6 passes through the cut-away slits 8f of the holding member 8, whereby the operating member 6 and the fixing member 7 are held by the holding member 8.

The operating member 6 and the fixing member 7 formed integrally by bending a rectangular plate are held by the holding member 8 at the same level as that of the operating member 6, thereby providing a wide freedom in designing. That is, when the holding member 8 holds the operating member 6 and the fixing member 7 at the level of the fixing member 7, the relationship of positions between the operating member 6 and the holding member 8 varies according to the thickness of the battery or the outer cover 4, whereby the relationship of positions, the strength of each component, and the like must be redesigned in accordance with the variation in size and the like of the components. When the operating member 6 and the fixing member 7 are held by the holding member 8 at the level of the operating member 6, only the distance between the operating member 6 and the fixing member 7 must be changed, that is, the length of a vertical portion A shown in FIG. 3 is changed, and complex redesigning is not necessary.

The operating tab 6a of the operating member 6 receives an external force at a contact part 6i (shown by a dashed line in FIG. 4) disposed at the rear face of the operating tab 6a between the mating tabs 6c, the operating tab 6a being supported by the holding member 8 at the contact part 6i in contact with the supporting platform 8h of the holding member 8. With this arrangement, the element 9 is protected against breakage by the supporting platform 8h receiving the external force applied to the operating member 6 at the upper face thereof (downwardly in FIG. 3).

The interruption structure 5 including the operating member 6 and the fixing member 7 sandwiches the casing 1 (power-generating unit). Therefore, compared with a method in which the interruption structure 5 is bonded to the sealed part 4 of the casing 1, the interruption structure 5 can be affixed easily by being positioned accurately without being affected by an adhesive (for example, by variation in adhesive strength due to temperature variation, elapse of time, a gas, variation in the thickness of the adhesive, and the like), and the strength of the sealed part 4 (top seal) does not significantly affect the characteristics of the interruption structure 5. Since the operating member 6 pivots on the contact part, it is not necessary for the casing 1 to expand evenly, and the position of the operating member 6 can be maintained stable, thereby stabilizing the operational pressure.

Since the operating member 6 and the fixing member 7 are formed integrally with each other, the element 9 is not likely to be damaged while handling the product, for example, while transporting the same. Moreover, the number of components can be reduced, whereby manufacturing processes can be simplified, and accurate positioning is made possible. When the operating member 6 and the fixing member 7 are not formed integrally with each other, or are not connected with each other by coupling, caulking, or the like, a laborious work, such that the operating member 6 is tentatively affixed by a tentatively affixing material and the affixing material is removed after mounting, is necessary.

A method for assembling the operating member 6, the fixing member 7, and the holding member 8 is described below.

As shown in FIG. 4, the element 9 is mounted on the lead plates 10 fixed to the holding member 8. The integrally formed operating member 6 and fixing member 7 are mounted to the holding member 8 from the left in FIG. 4. In this case, the mating plates 6d of the operating member 6 are inserted into the mating recesses 8b of the holding member 8, respectively. The mating tabs 6c of the operating member 6 are inserted into the cut-away slits 8f of the holding member 8, respectively, and are positioned under the supporting parts 8g of the holding member 8, respectively. The bent portion between the operating member 6 and the fixing member 7 is brought into contact with the holding member 8 at the left side of the holding member 8 shown in FIG. 4, whereby the assembly is completed. The casing 1 (power-generating unit) is mounted so as to be sandwiched by the operating member 6 and the fixing member 7 which are mounted on the holding member 8, as described above, and the lead terminal 2 is bent so as to be fixed to one of the lead plates 10, whereby the battery including a pressure-sensitive current-interruption structure, shown in FIGS. 1 to 3, is obtained.

The operation of the pressure-sensitive current-interruption structure is described below with reference to FIGS. 3 and 5.

When the battery shown in FIG. 3 is overcharged or is charged with electrical current larger than a regulated value, gas is produced due to chemical changes in an power generating element, thereby increasing pressure in the battery. By the increased internal pressure, the casing 1 is expanded so that the upper face thereof deforms toward the outside, whereby an end of the operating member 6 in contact with the casing 1 at the upper face thereof is upwardly displaced and the operating member 6 pivots about a fulcrum presented by the mating tabs 6c of the operating member 6, the supporting parts 8g and the supporting platform 8h of the holding member 8, and the contact part 6i of the operating member 6, thereby downwardly displacing the operating tab 6a disposed at the other end of the operating member 6. When the operating tab 6a is displaced over a predetermined value, as shown in FIG. 5, the protrusion 6b of the operating tab 6a downwardly presses the element 9 and breaks the same at an intermediate part thereof. With this operation, an electrical path for interruption (not shown) of the element 9 is cut, thereby interrupting conduction between the lead plates 10 and discontinuing charging the power-generating unit.

The operating member 6 may be formed in any fashion in which at least one end of the operating member 6 is disposed above or under the power-generating unit, the other end thereof is disposed in the vicinity of the sealed part 4, and the operating member 6 is displaced toward the outside as the internal pressure rises.

In the above-described interruption structure 5 disposed at the sealed part 4 of the casing 1, when the casing 1 is deformed by the internal pressure of the battery, an end of the operating member 6 is displaced. When the end of the operating member 6 is displaced over a predetermined value, the element 9 is broken by the other end of the operating member 6. With this arrangement, the interruption structure 5 can be mounted in a space formed in the vicinity of the sealed part 4 without increasing the thickness of a plate-shaped or button-like battery.

The interruption structure 5 may be formed in any fashion in which the interruption structure 5 is disposed above or under the sealed part 4, an end of the interruption structure 5 is electrically connected to at least one of the lead terminals 2 and 3, the other end of the interruption structure 5 is electrically connected to an external electrode, and electrical connection between one of the lead terminals 2 and 3 and the external electrode is interrupted by the displacement of the operating member 6 when the casing 1 is expanded over a predetermined value by an increased internal pressure.

Figure 7:
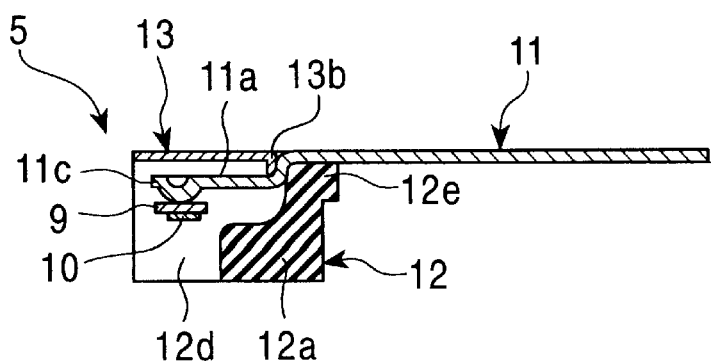
FIG. 7 is a longitudinally sectional view of the battery including a pressure-sensitive current-interruption structure, shown in FIG. 6.
Figure 8:
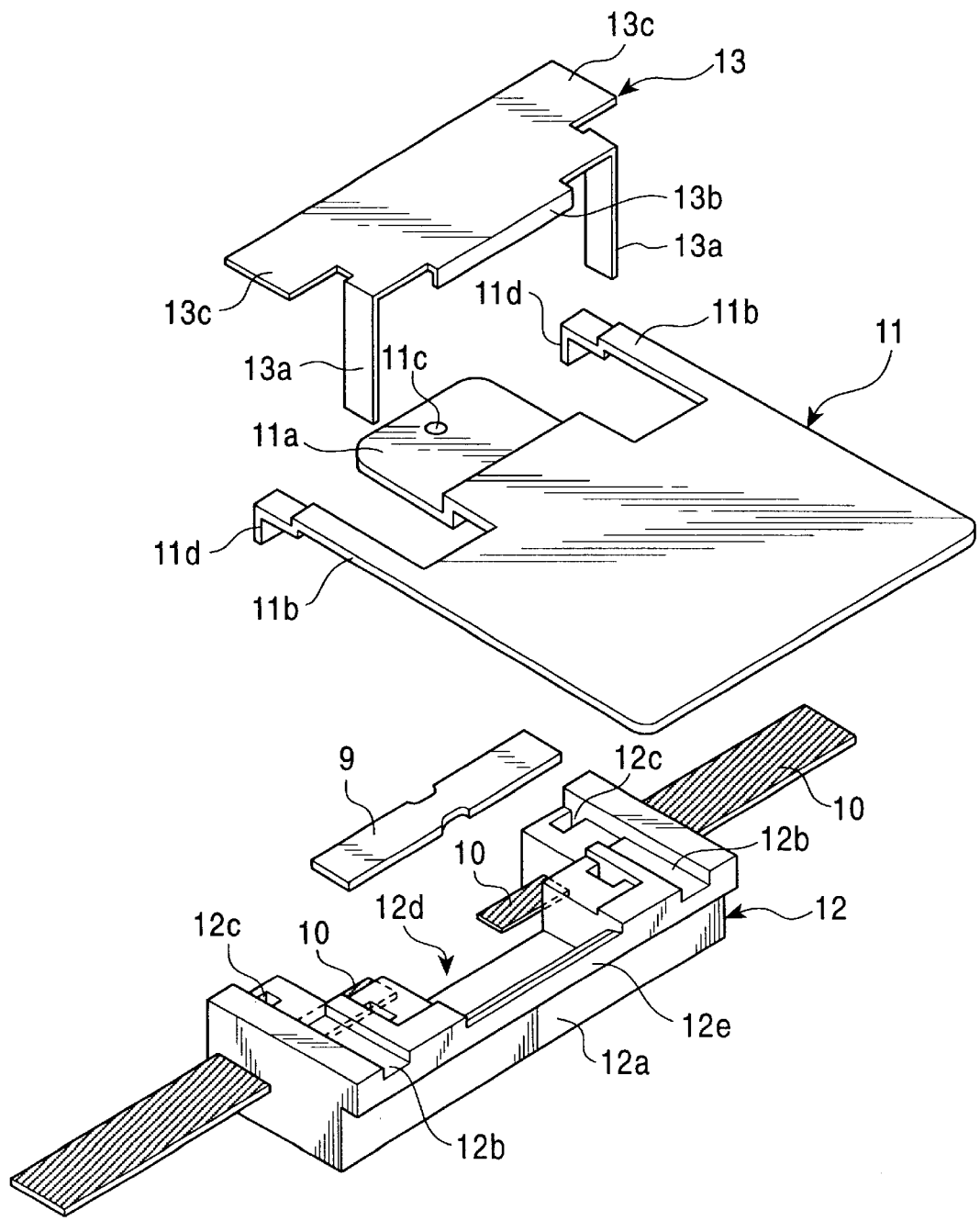
FIG. 8 is an exploded perspective view of a critical portion of the battery including a pressure-sensitive current-interruption structure, according to the second embodiment of the present invention.

A second embodiment according to the present invention is described below with reference to FIGS. 6 to 8.

Figure 6:
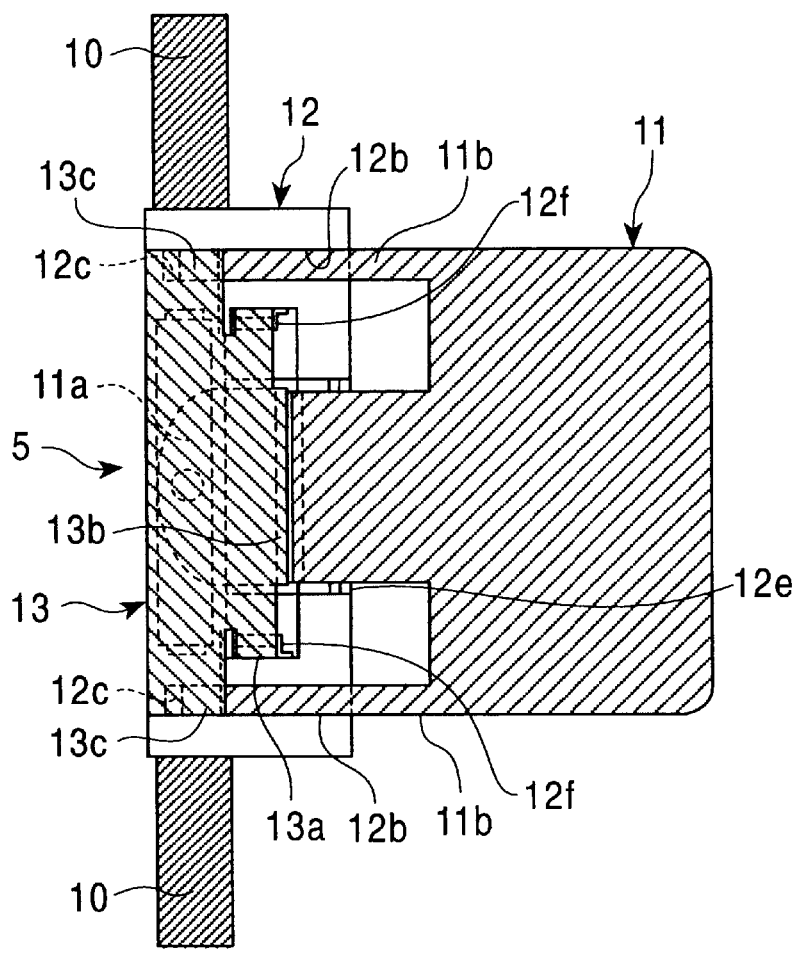
FIG. 6 is a plan view of a battery including a pressure-sensitive current-interruption structure, according to a second embodiment of the present invention.

FIG. 6 is a plan view of a battery including a pressure-sensitive current-interruption structure, according to the second embodiment of the present invention. FIG. 7 is a longitudinally sectional view of the battery shown in FIG. 6. FIG. 8 is an exploded perspective view of a critical portion of the battery including a pressure-sensitive current-interruption structure, according to the second embodiment of the present invention. The same components as and components having the same functions as the components and the functions of the components shown in FIGS. 1 to 5 are referred to with the same reference numerals, for which description in detail is omitted.

In a pressure-sensitive current-interruption structure described in the second embodiment, an interruption structure 5 is disposed, in the same manner as in the first embodiment, in a space formed above a sealed part 4 of a casing containing a power-generating unit.

In these drawings, the interruption structure 5, an element 9, lead plates 10, an operating member 11, a holding member 12, and a fixing member 13 are shown.

The operating member 11 is formed by bending a rectangular plate. The operating member 11 is disposed on a thin plate-shaped casing 1 (power-generating unit) at an end of the operating member 11, and includes an operating tab 11a and a pair of connecting tabs 11b formed by cutting away the operating member 11 at the other end thereof. The operating tab 11a has a protrusion 11c downwardly protruding so as to come into contact with the element 9 at a center of the upper face of the element 9. With this arrangement, the current can be stably interrupted by a breaking force applied from the operating tab 11a to the element 9 even when the battery is thin. The operating tab 11a is bent in a step-shape at the base end thereof so that the other end is disposed lower than the base end. Each connecting tab 11b is bent in a step-shape in the vicinity of the tip thereof and includes a mating tab lid formed with the tip of the connecting tab 11b being bent downwardly.

The fixing member 13 serves for mounting the operating member 11 to the holding member 12 so that the operating member 11 moves in a pivoting motion. The fixing member 13 formed by bending a plate includes insertion tabs 13a to be inserted into mating holes described below provided in the holding member 12, a contact tab 13b to come into contact with the lower level portion of the operating tab 11a at the upper face thereof toward the base end of the operating tab 11a, and pressing tabs 13c for pressing the connecting tabs 11b at the upper faces thereof.

The insulative holding member 12 is disposed above or under the sealed part 4. The holding member 12 includes a plate-shaped base 12a, mating recesses 12b formed individually along sides of the base 12a to mate with the connecting tabs 11b of the operating member 11, respectively, mating holes 12c formed in the upper face of the lower level portion of the base 12a to mate with the mating tabs 11d of the operating member 11, and a cut-away part 12d formed in the rectangular base 12a at a longer side opposite to the power-generating unit, for receiving the element 9. The holding member 12 also includes a supporting platform 12e formed at the other longer side of the base 12a opposing the power-generating unit and serving as a supporting point together with the contact tab 13b for supporting the operating member 11 at a supported part disposed at the bottom face of the operating member 11, and mating holes 12f to mate with the insertion tabs 13a of the fixing member 13.

Lead plates 10 which are electrical paths protrude from the edges opposing each other, respectively, of the cut-away part 12d of the holding member 12 for receiving the element 9. The element 9 is placed on the lead plates 10 so as to be electrically connected at ends of the element 9 to the lead plates 10 at the protruding ends of the lead plates 10, respectively. The other ends of the lead plates 10 protrude to the outside passing through the base 12a of the holding member 12. The operating member 11 comes into contact with the element 9 at the protrusion 11c of the operating member The assembly of components according to the second embodiment is described below.

The mating tabs 11d of the operating member 11 are coupled with the mating holes 12c so that the connecting tabs 11b of the operating member 11 are associated with the mating recesses 12b of the holding member 12. Thus, the operating tabs 11a of the operating member 11 is mounted on the holding member 12, and the protrusion 11c of the operating member 11 comes into contact with the element 9. The supporting platform 12e supports the operating member 11 at the lower face of the operating tab 11a of the operating member 11. The fixing member 13 is mounted on the operating member 11 so as to cover the operating tab 11a of the operating member 11. The fixing member 13 is mounted in a manner such that the insertion tabs 13a of the fixing member 13 are inserted into the mating holes 12f of the holding member 12 and the contact tab 13b of the fixing member 13 are brought into contact with the upper face of the lower level portion toward the base end of the operating tab 11a. The operating member 11 is fixed to the holding member 12 by caulking the insertion tabs 13a at the tips thereof which protrude downwardly from the mating holes 12f, whereby the interruption structure 5 is obtained.

The pressure-sensitive current-interruption structure according to the second embodiment operates as described below.

When the casing 1 expands as the internal pressure rises, an end of the operating member 11 disposed on the upper face of the casing 1 is displaced upwardly. In this case, according to the second embodiment, the operating member 11 shown in FIG. 7 pivots counterclockwise about a fulcrum presented by the step-shaped part of the operating tab 11a, the pressing tabs 13b, and the supporting platform 12e, and when the protrusion 11c of the operating tab 11a of the operating member 11 is displaced downwardly, the operating tab 11a of the operating member 11 downwardly presses the element 9 at the protrusion 11c of the operating tab 11a so as to break the element 9 at an intermediate part thereof. With this operation, an electrical path for interruption (not shown) of the element 9 is cut, thereby interrupting conduction between the lead plates 10 and discontinuing charging the power-generating unit.

Although according to the first and second embodiments, the casing 1 made of thin laminated films and covering a plate-shaped battery is sealed by hot welding or the like, and the pressure-sensitive current-interruption structure including the interruption structure 5 is mounted at a welded part (top-sealing part) which is the sealed part 4, the present invention is not limited to a rectangular battery, and the present invention may be applied to a circular battery such as a button-shaped battery which is provided with a casing having a sealed part.

Although according to the above-described embodiments, the element 9 includes a ceramic or a conductive path, the element 9 may be made of a metallic wire or a metallic leaf and may include a cutting blade instead of the protrusion 6b or 11c.

The overall element 9 may be slightly bent or the element 9 may be partly deformed slightly as long as it is formed in a plate-shaped shape.

According to the present invention, a battery can be reduced in size and be maintained in its reduced thickness because the pressure-sensitive current-interruption structure is received in a space formed at a sealed part of a casing. Compared with a method in which an interruption structure is bonded to the sealed part, the interruption structure 5 can be affixed easily by being positioned accurately without being affected by an adhesive (for example, by variation in adhesive strength due to temperature variation, elapse of time, a gas, variation in the thickness of the adhesive, and the like), and the strength of the sealed part 4 (top seal) does not significantly affect the characteristics of the interruption structure 5.

According to the present invention, the operational pressure can be stable.

According to the present invention, the element is not likely to be damaged while handling during transportation and the like.

According to the present invention, the number of components can be reduced, manufacturing processes can be simplified, and the components can be positioned accurately.

According to the present invention, the element is not likely to be damaged when an external force is applied to the operating member in a direction perpendicular to the surface thereof.

According to the present invention, the operating member and the fixing member are held by the holding member at the same level as that of the operating member, whereby a wide freedom in designing is provided in which the distance between the operating member and the fixing member is simply changed, as needed, in accordance with the variation in size of other components.

What is claimed is:

1. A battery including a pressure-sensitive current-interruption structure, comprising:
   a plate-shaped power-generating unit;
   a casing hermetically sealed and containing the power generating unit, deformable by an internal pressure;
   a plurality of lead terminals which are electrical paths from the power generating unit to the outside of the casing;
   a sealed part, which is a part of the casing, disposed at an end of the power generating unit and formed thinner than the thickness of the casing at a part here the power generating unit is contained; and
   an interruption structure including:
      an operating member disposed outside the casing, at least one end of the operating member being disposed above or under the power generating unit and displaceable toward the outside as the internal pressure rises;
      a fixing member having at least one part thereof being positioned opposing the operating member across the power generating unit;
      an insulative holding member disposed above or under the sealed part and fixed to the fixing member; and an element having an electrically conductive path, held by the holding member, the element being electrically connected to at least one of the lead terminals at one end of the element and to an external electrode at the other end of the element, wherein the other end of the operating member is positioned in the vicinity of the element, said other end of the operating member being displaced in accordance with the displacement of said one end of the operating member caused by the internal pressure, thereby cutting the element when displaced by more than a predetermined value.

2. A battery including a pressure-sensitive current-interruption structure, according to claim 1, wherein the operating member and the fixing member are connected to each other.

3. A battery including a pressure-sensitive current-interruption structure, according to claim 2, wherein the operating member and the fixing member are formed integrally with each other.

4. A battery including a pressure-sensitive current-interruption structure, according to claim 1, wherein the operating member includes a contact part for receiving an external force applied to a surface of the operating member, and the fixing member includes a supporting platform to come into contact with the contact part.

5. A battery including a pressure-sensitive current-interruption structure, according to claim 1, wherein a fixing part between the fixing member and the holding member is positioned at the same level as that of the operating member.

6. A battery including a pressure-sensitive current-interruption structure, comprising:

a plate-shaped power-generating unit;

a casing hermetically sealed and containing the power generating unit, deformable by an internal pressure;

a plurality of lead terminals which are electrical paths from the power generating unit to the outside of the casing;

a sealed part, which is a part of the casing, disposed at an end of the power generating unit and formed thinner than the thickness of the casing at a part where the power generating unit is contained; and an interruption structure including:

an insulative holding member disposed above or under the sealed part and fixed to a fixing member;

an element having an electrically conductive path, held by the holding member, the element being electrically connected to at least one of the lead terminals at one end of the element and to an external electrode at the other end of the element; and an operating member disposed outside the casing, one end of the operating member being disposed above or under the power generating unit and displaceable toward the outside as the internal pressure rises, the other end of the operating member being disposed in the vicinity of the element, wherein said other end of the operating member is positioned opposite to said one end with respect to a supported part of the operating member and the opposite to the sealed part with respect to the element, said other end of the operating member being displaced in accordance with the displacement of said one end of the operating member in the opposite direction caused by the internal pressure, thereby cutting the element when displaced by more than a predetermined value.

7. A battery including a pressure-sensitive current-interruption structure, according to claim 6, the operating member and the-fixing member are connected to each other.

8. A battery including a pressure-sensitive current-interruption structure, according to claim 7, wherein the operating member and the fixing member are formed integrally with each other.

9. A battery including a pressure-sensitive current-interruption structure, according to claim 6, wherein the operating member includes a contact part for receiving an external force applied to a surface of the operating member, and the fixing member includes a supporting platform to come into contact with the contact part.

10. A battery including a pressure-sensitive current-interruption structure, according to claim 6, wherein a fixing part between the fixing member and the holding member is positioned at the same level as that of the operating member.

* * * * *

UNITED STATES PATENT AND TRADEMARK OFFICE
CERTIFICATE OF CORRECTION

PATENT NO.    : 6,593,025 B2
DATED         : July 15, 2003
INVENTOR(S)   : Tadamitsu Azema It is certified that error appears in the above-identified patent and that said Letters Patent is hereby corrected as shown below:

<u>Column 10,</u>
Line 55, after "a part" delete "here" and substitute -- where -- in its place.

<u>Column 12,</u>
Line 18, after "member and" delete "the".
Line 27, delete "the-fixing" and substitute -- the fixing -- in its place.

Signed and Sealed this

Fourth Day of November, 2003

JAMES E. ROGAN
*Director of the United States Patent and Trademark Office*